July 28, 1953 C. B. DEWEY ET AL 2,647,244
PREPATCH CONNECTOR BAY
Filed Aug. 31, 1950 5 Sheets-Sheet 1

INVENTORS
CHALMERS B. DEWEY
NORMAN C. ZATSKY
BY
Burgess, Ryan & Hicks
ATTORNEYS

July 28, 1953

C. B. DEWEY ET AL 2,647,244

PREPATCH CONNECTOR BAY

Filed Aug. 31, 1950

INVENTORS
CHALMERS B. DEWEY
NORMAN C. ZATSKY
BY
Burgess, Ryan & Hinks
ATTORNEYS

July 28, 1953 C. B. DEWEY ET AL 2,647,244
PREPATCH CONNECTOR BAY
Filed Aug. 31, 1950 5 Sheets-Sheet 3
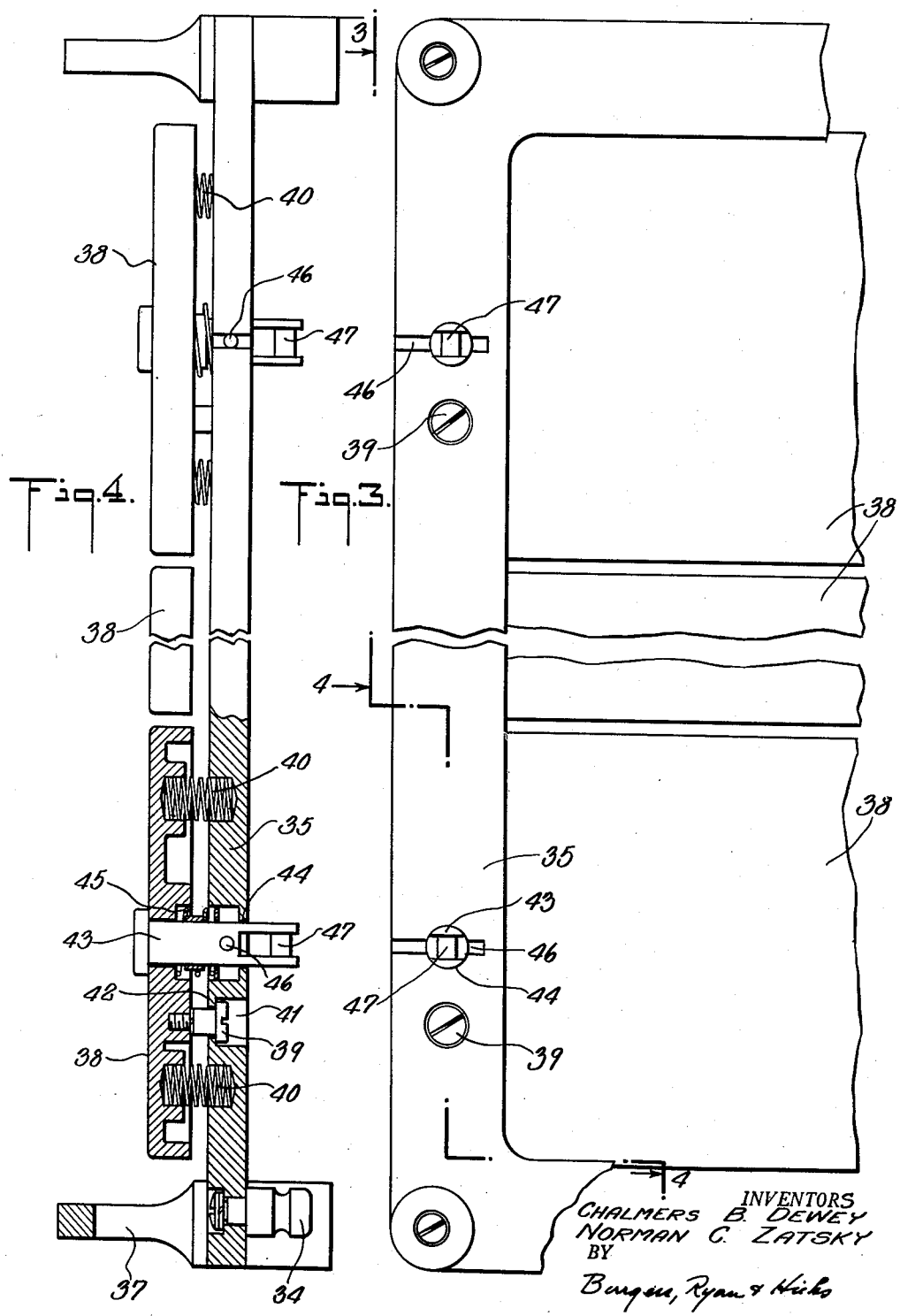
INVENTORS
CHALMERS B. DEWEY
NORMAN C. ZATSKY
BY
Burgess, Ryan & Hicks
ATTORNEYS

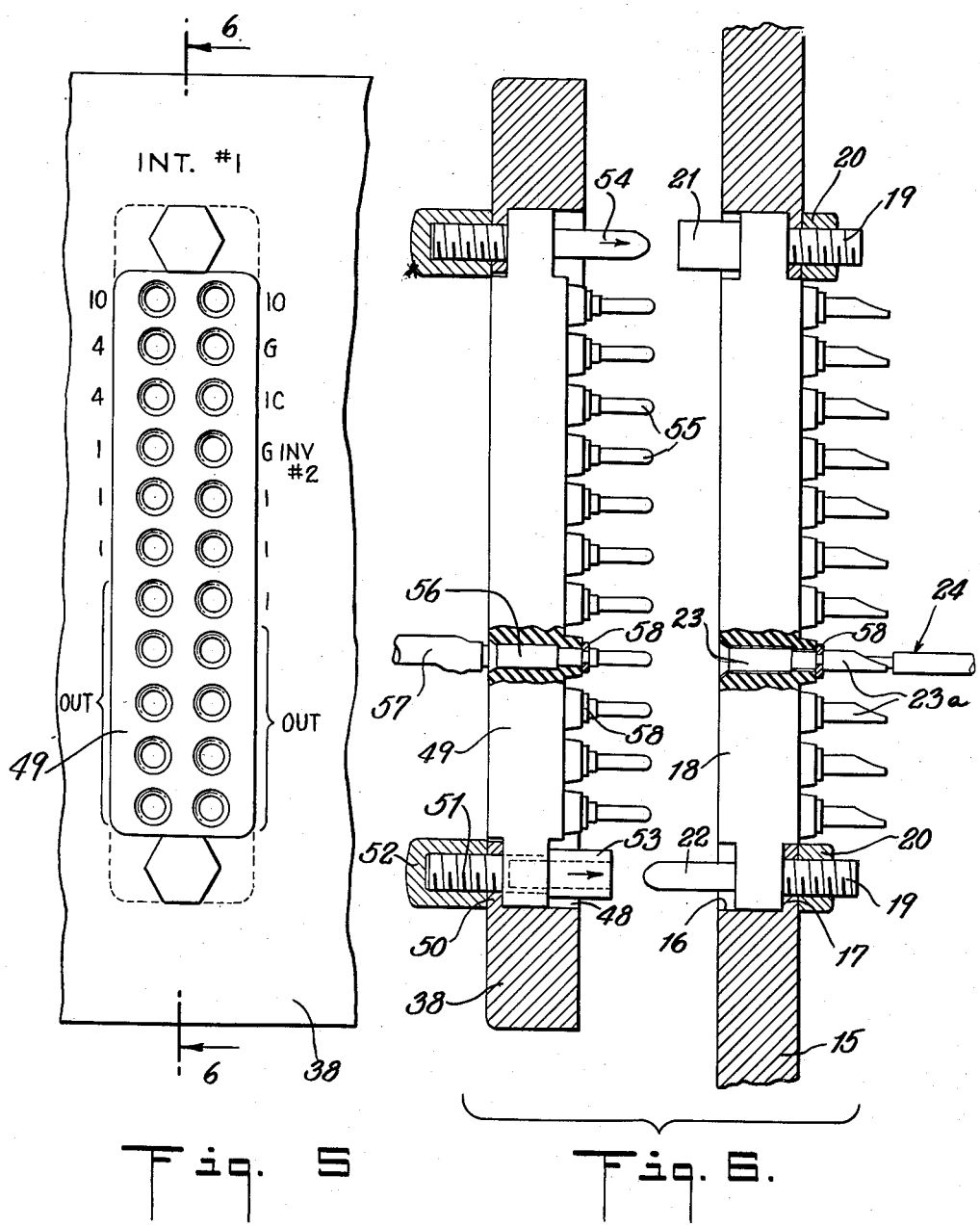

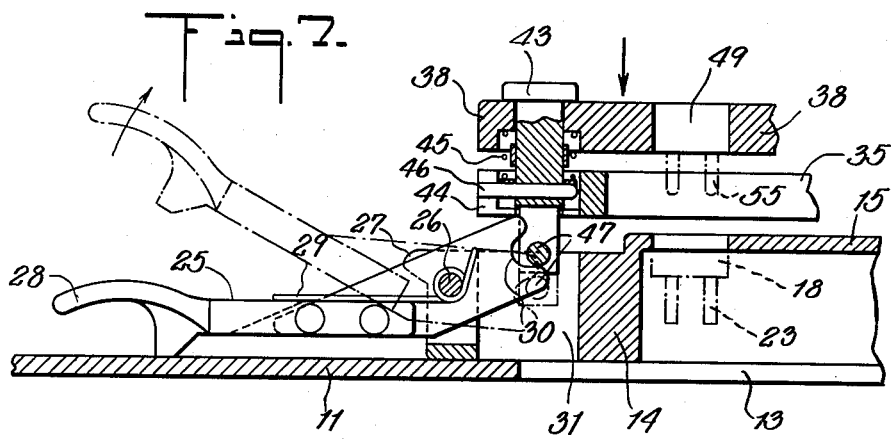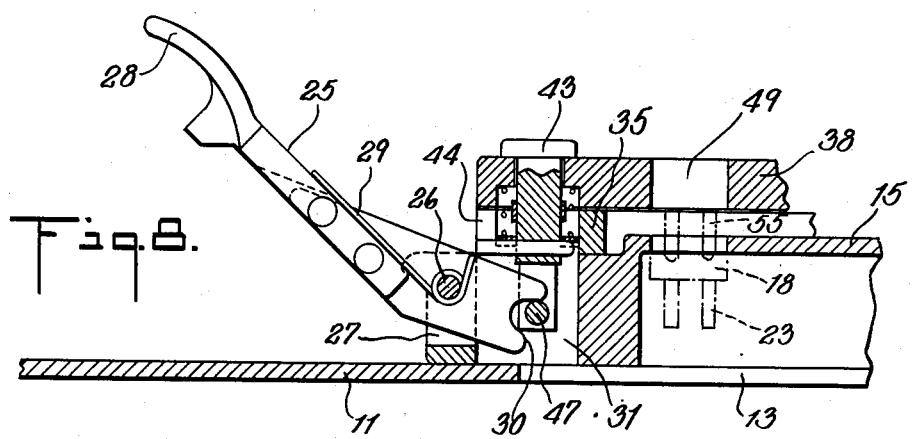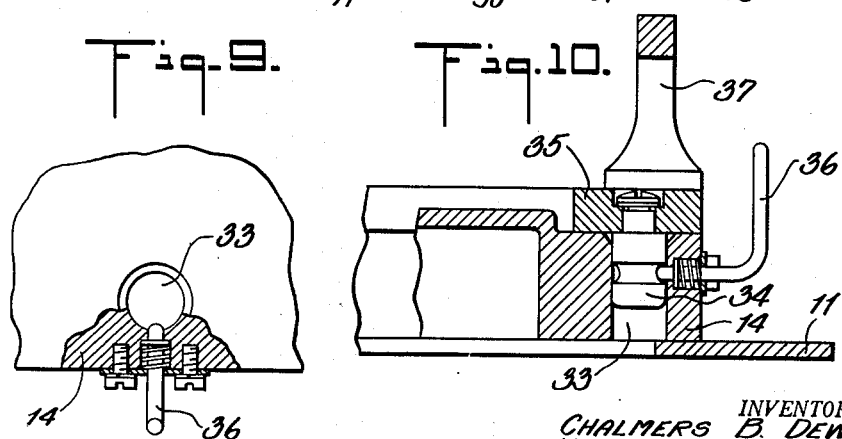

Patented July 28, 1953

2,647,244

UNITED STATES PATENT OFFICE 2,647,244

PREPATCH CONNECTOR BAY

Chalmers B. Dewey, Manhasset, and Norman C. Zatsky, Valley Stream, N. Y., assignors to Reeves Instrument Corporation, New York, N. Y., a corporation of New York Application August 31, 1950, Serial No. 182,498

15 Claims. (Cl. 339—45)

1

The present invention relates to improvements in electrical connector means and relates more particularly to a removable connector bay for making the desired circuit connections for operation of an electrical instrument such as an electronic computer.

One of the features of the present invention is the provision of a removable connector bay by means of which it is possible to connect or disconnect circuits involving an extremely large number of electrical connections to an electrical instrument without difficulty. In accordance with the present invention, the circuit connections required for the operation of an electrical instrument such as an electronic computer are established on the removable connector bay at a point remote from the instrument and these circuits may then be connected to or disconnected from the circuits of the instrument at any time without disturbing the particular circuits on the connector bay.

This arrangement makes it possible to utilize an instrument such as an electronic computer for the solution of a number of problems involving different circuit connections without disturbing the particular circuits which have been established on such a removable connector bay. The importance of this will be appreciated when it is realized that the circuits of an electronic computer for the solution of a given problem may involve over five hundred connections and it may take several days to make the necessary connections for the solution of one particular problem. It is not only time consuming but costly to disturb such circuit connections once they have been made and consequently, the circuit connections for solving a given problem may often remain set up on the computer over a considerable period of time if any changes in the factors involved are being considered before making further computations on the instrument. This often results in an expensive instrument, such as a computer, being rendered useless for other purposes over long periods of time.

The present invention is particularly directed to providing a removable connector bay by means of which it is possible to make a large number of good electrical connections quickly and without the use of undue force. Another feature of the invention is to provide a connector bay for making such connections on which the desired circuits may be established in such a manner that they will not be disturbed when the connections are made or disconnected. By using

2 a number of such removable connector bays, the fullest and most economical use is permitted to be made of the instrument with which they are used.

Various other objects and advantages of the present invention will be apparent and best understood from the following description and the accompanying drawings in which:

Fig. 3 is a rear view of the front half of the connector bay illustrated in Fig. 1;

Fig. 4 is a side view in partial section along the line 4—4 of Fig. 3;

Fig. 5 is a front view on an enlarged scale of one of the connector elements for the connector bay illustrated in Fig. 1;

Fig. 6 is a section view taken along the line 6—6 of Fig. 5;

Fig. 7 is a fragmentary view in section taken along the line 7—7 of Fig. 1, but on an enlarged scale and showing the relative positions of the elements of the connector bay prior to engagement of the contact elements;

Fig. 8 corresponds to Fig. 7, but shows the relative positions of the elements of the connector bay when the contact elements are engaged;

Fig. 9 is a fragmentary plan view in partial section of a portion of the connector bay showing one of the locating pins therefor; and Fig. 10 is a side view in vertical section of the portion of the connector bay illustrated in Fig. 9.

Figure 2:
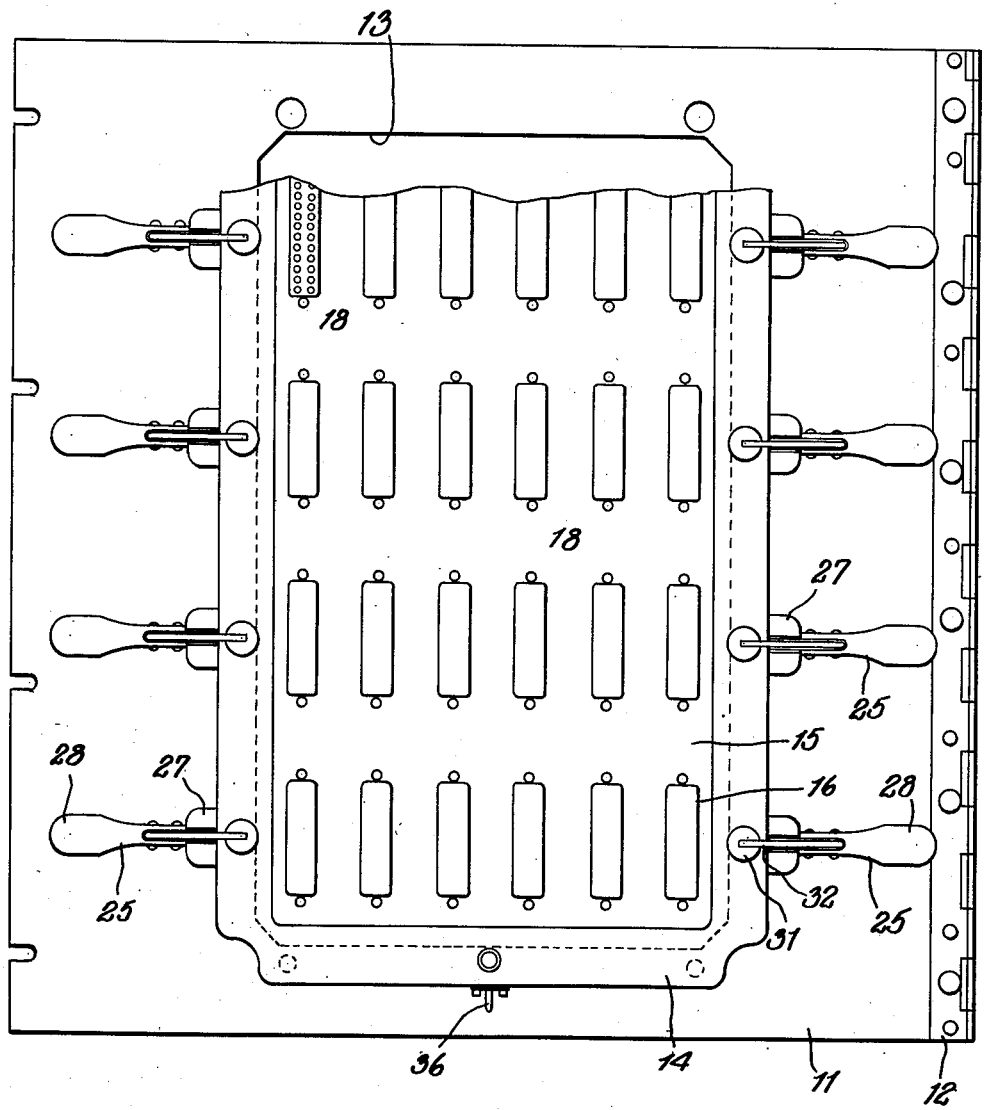
Fig. 2 is a front view of the rear half of the connector bay illustrated in Fig. 1.

Referring now to the drawings in detail, there is a mounting panel or plate 11 which may be secured in a relatively fixed position to the housing (not shown) of an instrument such as an electronic computer by a hinge 12. As shown best in Fig. 2, the plate 11 has an opening 13 therein surrounding which there is a rim 14.

The rim 14 supports a raised panel 15 (which may be made integral with the rim) that extends over the opening 13 in the panel 11. The panel 15 has a series of spaced openings 16 therein which are spaced across the panel in horizontal and vertically aligned rows.

As shown in Fig. 6, each of the openings 16 has an inwardly extending flange 17 at the ends thereof and at the bottom of the openings. Connector blocks 18 of suitable insulating material are fitted within each of the openings 16 with their ends seated on the flanges 17. The connector blocks 18 carry studs 19 which project through openings in the flanges 17 and the connector blocks are secured in place by nuts 20 which are threaded to the studs 19. When the nuts 20 are loosened, the position of connector blocks relative to the panel 15 may be varied slightly for purposes of alignment with cooperating connector blocks which will be described hereinafter. Each of the connector blocks 18 has a female aligning member 21 at one end thereof and a male aligning member 22 at the other end thereof. In addition, each connector block 18 carries a plurality of contact elements or members 23 thereon. The contact elements have contact portions consisting of the female or socket half of a pin type electrical connector located on the face of the connector block and wiring terminals or prongs 23a extending from the rear of the connector block to which soldered wiring connections may be made as indicated at 24.

The wiring connections 24 connect the various components of the computer to the appropriate contact members 23 of the connector blocks 18 and such connections may be readily made by opening the hinged panel 11. This arrangement permits easy access to the wiring connections 24 so that they can be repaired or changed if necessary.

A series of clamping levers 25 are pivotally mounted along opposite sides of the rim 14. As shown best in Figs. 7 and 8, the clamping levers 25 are pivoted on shafts 26 which are supported by blocks 27 extending from the sides of the rim 14. Each of the clamping levers 25 has a finger-engaging grip 28 at one end thereof which is biased toward the plate 11 by a spring 29. The other ends of the levers 25 are bifurcated as indicated at 30 and extend into openings 31 in the rim through slots 32.

Openings 33 are also provided at the top and bottom edges of the rim 14 to receive positioning pins 34 carried by a removable frame 35 as shown in Figs. 9 and 10. The openings 33 and the positioning pins 34 cooperating therewith on the top and bottom edges respectively of the frames 14 and 35 may be made of different sizes or shapes to insure that the removable frame will be positioned with the rightside up when it is put in place. In addition, the pins 34 in the removable frame 35 may be provided with grooves to receive the end of a threaded detent 36 carried by the frame 14 to secure the removable frame against accidental displacement. The removable frame 35 is also provided with handles 37 by means of which it may be conveniently carried.

A series of horizontally extending panels 38 are supported on the removable frame 35. The panels 38 are movably secured to the sides of the frame 35 by studs 39 and springs 40. As shown best in Fig. 4, the springs 40 are seated in sockets in the opposing faces of the panels 38 and the sides of the removable frame 35 and resiliently urge the panels 38 outwardly or away from the frame 35. The studs 39 are threaded to the panels 38 and slidably engage with openings 41 in the sides of the removable frame 35. The studs 39 have headed portions that engage with flanges 42 surrounding the ends of the openings 41 and thus, limit the movement of the panels 38 away from the frame and maintain the springs 40 under compression.

Referring now to Figs. 4 and 7, a securing pin 43 is carried at each end of the panels 38 and through an opening 44 in the side of the removable frame 35 and into one of the openings 31 in the rim 14. The securing pins 43 have headed portions which engage with the outer faces of the panels 38 and they are held in place by springs 45 and pins 46 located on the other side of the panel. The ends of the pins 43 projecting beyond the removable frame 35 are slotted and bars 47 extend across the slotted ends thereof. When the removable frame 35 is put in position on the frame 14, the slotted ends of the securing pins 43 enter the openings 31 in the rim 14 and their ends clear the top leg of the bifurcated ends 30 of the clamping levers 25. However, the bars 47 carried thereby strike the lower leg of the bifurcated ends 30 of the clamping levers 25 and thus, depress the inner ends of the levers. This elevates the outer or operating ends 28 of the clamping levers and raises the outer ends of the levers from the plate 11 (as indicated by the dotted lines in Fig. 7) to a position where they may be conveniently grasped by the fingers.

Referring now to Figs. 5 and 6, each of the panels 38 has a series of openings 48 therein. A connector block 49 is fitted within each of the openings and is seated against inwardly extending flanges 50 at the ends of the openings. The connector blocks 49 are secured in place by studs 51 and nuts 52 and may be properly positioned before the nuts 52 are tightened. A female aligning pin 53 and a male aligning pin 54 extend from the rear face of the connector block 49 at opposite ends thereof and in opposing relation to the male aligning pin 22 and the female aligning pin 21, respectively, of the permanently mounted connector blocks 18 carried by the panel 15. In addition, each of the connector blocks 49 carries a series of contact elements 55 thereon. The contact elements 55 have contact making portions located on the rear face thereof which consist of the pin or male parts of a pin-type connector. The contact elements 55 also have terminals on the other or front face of the connector block in the form of a socket with an opening on the face of the connector block.

Prior to the engagement of the contacts of the respective connector blocks, pin portions of the contact elements 55 on the rear of the connector blocks 49 are aligned with respect to the socket portions of the contact members 23 on the face of the connector blocks 18, the aligning means 21, 22 and 53, 54 on the faces of the respective connector blocks being brought into engagement. The ends of the male aligning pins 22 and 54 and the ends of the contact pins on the contact elements 55 are tapered or pointed so that they will readily enter their mating female members and align themselves therewith. In addition, the aligning pins 22 and 54 are somewhat longer than the contact pins of the contact elements 55 so that they enter into engagement with their female counterparts and align the connector block before the contact elements are engaged.

The connector blocks 18 and 49 are molded with openings therein to receive the respective contact elements 23 and 55 carried thereby. The contact elements are secured in the openings in the connector blocks by spring clips 58 which engage with the contact elements. The contact members are loosely fitted in the openings in the connector blocks so as to permit a slight movement of the contact members with respect to the connector blocks. This insures that there will be no binding or jamming when the contact members 55 are finally brought into engagement with the contact members 23.

Figure 1:
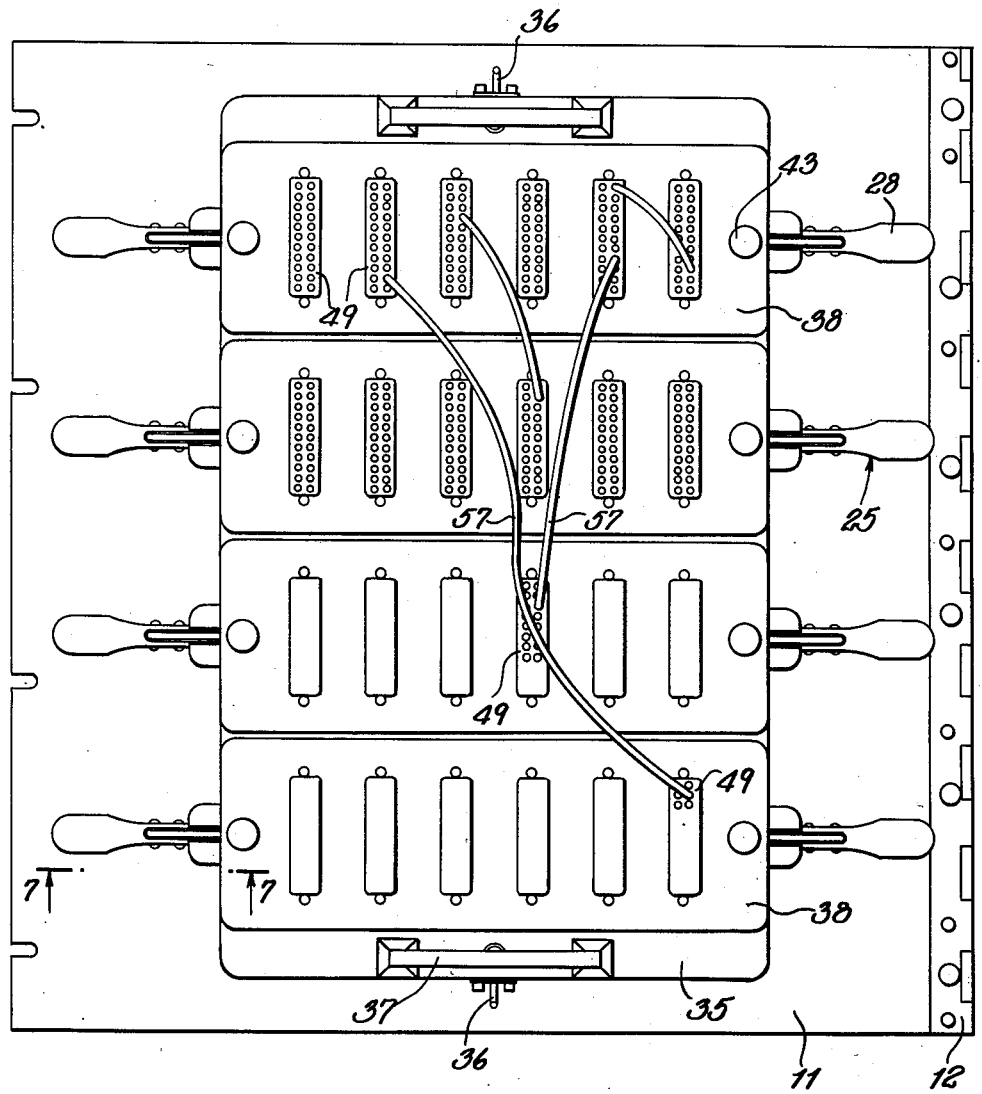
Fig. 1 is a front view of a connector bay assembly embodying the invention.

As shown in Figs. 1 and 6, the tipped ends 56 of suitable connector cords 57 for making circuit connections as desired to the various elements of the computer may be inserted in the socket portions of the contact members 55 from the front of the panels 38 to establish the desired circuits on the removable connector bay.

When the removable frame 35 has been brought into proper position on the frame 14 and is secured by the detents 36, the handles 28 of the clamping levers 25 are raised from the plate 11 in the manner previously described. At this time, the contact elements of each of the contact blocks 49 on the movable panels 38 are aligned with the opposing contact elements of the contact blocks 18 on the fixed panel 15 by the aligning pins. This condition is visibly indicated by the raised handles of the clamping levers although at this time, the contact members 55 and 23 of the respective contact blocks have not yet been brought into engagement with each other. The final engagement of the contact members is accomplished by simultaneously raising the outer ends 28 of each set of clamping levers 25 at opposite sides of each of the panels 38 to the position indicated in Fig. 8. This brings the upper leg of the bifurcated end 30 of the clamping levers into engagement with the bars 47 of the securing pins 43 and forces the pins 43 and the panel 38 to which they are attached downward against the pressure of the springs 40. This movement of the movable panel brings the contact members 55 into engagement with the contact members 23 and to disengage the contact members, the outer ends 28 of the clamping levers are merely pushed down.

The contacts carried by each of the panels 38 are engaged by separate operations, but this may be done quickly and easily and without disturbing circuit connections from one panel to another. This arrangement permits an almost unlimited number of contacts to be made in a very short time without any difficulty due to binding of the contacts and without the use of any great force.

As indicated in Fig. 5 appropriate identification characters may be applied to the contact members of each of the panels so that wiring connections may be made thereto at a point remote from the computer. In order to insure alignment of the various elements carried by the removable frame 35 with corresponding elements carried by the fixed panel 15, a master jig or fixture is applied to each of these units prior to the final tightening of the nuts 52 and 20 which hold the connector blocks 49 and 18 in place on their respective panels.

It will be understood that various modifications and changes may be made in the embodiment of the invention which has been illustrated and described herein without departing from the scope of the invention as defined by the claims appended hereto.

We claim:

1. In a removable connector bay for engaging and disengaging a plurality of circuit connections to an instrument such as an electronic computer, the combination of a panel mounted in a relatively fixed position on an instrument, a plurality of spaced contact elements carried by said panel, said contact elements having wiring terminals on the rear of the panel for connection to the instrument and contact portions on the front of the panel, a support detachably secured to said panel, a panel movably secured to said support, a plurality of spaced contact elements carried by said movable panel, said contact elements having contact portions on the rear of said movable panel which are positioned in opposing relation to the contact portions of the first-mentioned contact elements and terminal portions on the front of said movable panel for receiving detachable circuit connectors and clamping means on the instrument for engaging with said movable panel and moving said panel with respect to the support to bring the opposing contact engaging portion of the respective contact elements into and out of engagement.

2. In a removable connector bay for engaging and disengaging a plurality of circuit connections to an instrument such as an electronic computer, the combination as defined in claim 1 which includes means carried by the opposing connector blocks for aligning the contact portions of the contact elements carried thereby.

3. In a removable connector bay for engaging and disengaging a plurality of contacts making circuit connections to an instrument such as an electronic computer, the combination of a panel mounted in a relatively fixed position on an instrument, a series of connector blocks mounted on said panel, a plurality of contact elements carried by each of said connector blocks, said contact elements having wiring terminals on the rear of said connector blocks for connection to the instrument and contact portions on the front of said connector blocks, a frame detachably secured to said panel, a series of panels movably secured to said frame, a series of connector blocks carried by each of said movable panels, each of said connector blocks being positioned in opposing relation to one of the connector blocks of the first series, a plurality of contact elements carried by each of said last-mentioned connector blocks, said last-mentioned contact elements having contact portions on the rear of said connector blocks and terminal portions on the front of said connector blocks for receiving detachable connector cords and clamping means on the instrument for engaging with the movable panels and moving said panels with respect to the frame to bring the contact portions of the contact elements of the opposing connector blocks into and out of engagement.

4. In a removable connector bay for engaging and disengaging a plurality of contacts making circuit connections to an instrument such as an electronic computer, the combination of a panel mounted in a relatively fixed position on an instrument, a series of connector blocks mounted on said panel, a plurality of contact elements carried by each of said connector blocks, said contact elements having wiring terminals on the rear of said connector blocks for connection to the instrument and contact portions on the front of said connector blocks, a frame detachably secured to said panel, a series of panels movably secured to said frame, a series of connector blocks carried by each of said movable panels, each of said connector blocks being positioned in opposing relation to one of the connector blocks of the first series, a plurality of contact elements carried by each of said last-mentioned connector blocks, said last-mentioned contact elements having contact portions on the rear of said connector blocks and terminal portions on the front of said connector blocks for receiving detachable conductor cords, means for aligning the connector blocks of one series with the connector blocks of the other series and clamping means on the instrument for engaging with the movable panels and moving said panels with respect to the frame to bring the contact portions of the contact elements of the opposing connector blocks into and out of engagement.

5. In a removable connector bay for detachably making a plurality of circuit connections to an instrument such as an electronic computer, the combination of a pair of opposing panels, one of said panels being supported in a relatively fixed position on the instrument, means for detachably supporting the other of said panels in opposing relation to said fixed panel, a floating connection between said last-mentioned panel and said supporting means, said floating connection permitting movement of said panel with respect to said supporting means, a plurality of electrical contact elements carried by each of said panels, the contact elements of the respective panels having contact portions located on the opposing faces of said panels, aligning means carried on opposing faces of said panels, said aligning means entering into engagement prior to engagement of the contact elements carried by said panels, and clamping means secured to the instrument, said clamping means engaging with said movable panel when said aligning means are in engagement and being operative to move the contact element of the movable panel into and out of engagement with the contact elements of the fixed panel.

6. In a removable connector bay for detachably making a plurality of circuit connections to an instrument such as an electronic computer, the combination as defined in claim 5 wherein said clamping means includes a pair of levers pivoted at opposite sides of the fixed panel, each of said levers having a portion at one end thereof engaging with the movable panel upon engagement of the aligning means and handle portions at the other ends thereof, said handle portions being raised upon engagement of the levers with the movable panel.

7. In a removable connector bay for detachably making a plurality of circuit connections to an instrument such as an electronic computer, the combination as defined in claim 5 wherein the contact elements are loosely fitted in their respective panels.

8. In a removable connector bay for detachably making a plurality of circuit connections to an instrument such as an electronic computer, the combination of a panel supported in a relatively fixed position on an instrument on said panel, a connector block supported on said panel, a plurality of contact elements carried by said connector block, said contact elements having female contact portions with entrances thereto on the front of the connector block and wiring terminals located on the rear of the connector block, a frame detachably secured to said panel, a panel movably supported on said frame, a second connector block supported on said movable panel in opposing relation to said first-mentioned connector block, a plurality of contact elements carried by said second connector block, said contact elements having male contact portions extending from the rear face of the second connector block in position to enter the female contact portions of the contact elements of the first-mentioned connector block, aligning means carried on the opposing faces of said connector blocks, said aligning means entering into engagement prior to the entrance of the male portions into the female portions of the respective sets of contact elements and clamping means secured to the instrument, said clamping means engaging with the movable panel when said aligning members are in engagement and being operative to move the contact elements of connector block on the movable panel into and out of engagement with the contact elements of the connector block on the fixed panel.

9. In a connector bay for detachably making a plurality of electrical circuit connections to an instrument such as an electronic computer, the combination which includes a panel supported in a relatively fixed position on the instrument, a series of connector blocks of insulating material supported in spaced relation to each other on said panel, each of said connector blocks containing a plurality of spaced contact elements having contact portions on the face thereof, a frame detachably secured to said panel, a panel movably mounted on said frame, a series of connector blocks of insulating material carried by said movable panel in spaced relation to each other, each of the last-mentioned connector blocks containing a plurality of spaced contact elements having contact portions on the rear thereof, said last-mentioned contact portions being positioned in opposing relation to the contact portions of the contact elements of the first-mentioned series of connector blocks, interengaging means on the opposing connector blocks of the respective series of connector blocks for aligning the contact elements thereof and means for moving said movable panel and the contact elements of the connector blocks carried thereon into and out of engagement with the contact elements of the opposing series of connector blocks.

10. In a connector bay for detachably making a plurality of electrical circuit connections to an instrument such as an electronic computer, the combination which includes a panel supported in a relatively fixed position on the instrument, a series of connector blocks of insulating material supported in spaced relation to each other on said panel, each of said connector blocks containing a plurality of spaced contact elements having contact portions on the face thereof, a frame detachably secured to said panel, a panel movably mounted on said frame, a series of connector blocks of insulating material carried by said movable panel in spaced relation to each other, each of the last-mentioned connector blocks containing a plurality of spaced contact elements having contact portions on the rear thereof, said last-mentioned contact portions being positioned in opposing relation to the contact portions of the contact elements of the first-mentioned connector blocks, interengaging means on the opposing connector block of the respective series of connector blocks for aligning the contact elements thereof and clamping levers pivoted on the first-mentioned panel at opposite sides of said movable panel, said levers engaging with said movable panel and being operative to move said movable panel and the contact elements of the connector blocks carried thereon into and out of engagement with the contact elements of the opposing series of connector blocks.

11. In a removable connector bay for connecting and disconnecting a plurality of prewired circuits to an electrical instrument such as an electronic computer, the combination which includes a panel mounted in a relatively fixed position on an instrument, said panel having a number of spaced openings therein, said openings being arranged in rows on said panel, circuit connecting means adjustably secured to said panel in each of said openings, said circuit connecting means having wiring terminals connected to elements of the instrument located on the rear of said panel and contact portions located on the front of said panel, a frame detachably secured to said panel, a series of panels movably secured to said frame in opposing relation to the first-mentioned panel, each of said panels having a row of openings therein positioned to register with one row of the openings in the first-mentioned panel, circuit connecting means adjustably secured to said movable panels in each of the openings therein, said circuit connecting means having contact portions located on the rear of said movable panels in opposing relation to the contact portions of the first-mentioned panel and terminals for receiving detachable circuit connectors on the front of said panels, interengaging means extending from the opposing faces of said movable panels and the fixed panel for aligning the contact portions of the respective circuit connecting means thereon and means engaging with each of said movable panels for moving the contact portions of the connector means on said panels into and out of engagement with the contact portions of the connecting means on the fixed panel.

12. A detachable unit of a connector bay for making a plurality of prewired circuit connections to an electronic computer, which comprises a frame, said frame defining an opening and being detachably secured to a connection panel of an electronic computer, positioning means on the frame for locating the frame in a predetermined position on the connection panel, a panel carried by and extending across the opening defined by the frame, said panel being movable with respect to the frame and the connection panel of the computer, a plurality of contact elements carried by said movable panel, each of said contact elements having a contact-plug receiving opening located on the front of the movable panel and having a male portion projecting from the rear of the movable panel in opposing relation to a female contact element carried in a fixed position on the connection panel of the computer, means on the movable panel engaging with means on the connection panel for aligning the contact elements on the movable panel with the opposing fixed contact elements on the connection panel and lever-engaging means on the movable panel, said lever-engaging means being engageable by pivoted levers carried on the connector panel for moving the movable panel relative to the frame.

13. In a detachable unit of a connector bay for making a plurality of prewired circuit connections to an electronic computer, the combination of a frame, said frame defining an opening, a panel carried by and extending across the opening in the frame, said panel being movable relative to the frame in a direction at right angles to the plane of the opening defined by the frame, a series of connector blocks carried by said panel, a plurality of spaced contact elements carried by said panel, each of said contact elements having a contact prong extending from the rear face of the panel and a terminal receiving opening located on the front face of the panel and lever-engaging means on the panel for moving the same with respect to the frame.

14. In a detachable unit of a connector bay for connecting a plurality of prewired circuits to the circuits of an electronic computer, the combination of a frame, said frame defining an opening, a series of panels carried by said frame and extending across the opening, said panels being movably secured to the frame and being movable at right angles to the opening defined thereby, a series of spaced connector blocks carried by each of said panels, a plurality of contact elements carried by each of said connector blocks, each of said contact elements having a contact prong extending from the rear face of the connector blocks and a terminal receiving opening located on the front face of the connector blocks and lever-engaging means on each of the panels for moving the same relative to the frame.

15. In a connector bay for detachably making a plurality of prewired electrical circuit connections to an electronic computer wherein a connection panel is supported in a relatively fixed position on the instrument and a series of connector blocks of insulating material are supported in spaced relation on said panel with each of said connector blocks carrying a plurality of spaced contact elements having contact prong-receiving openings on the face thereof, the combination of a frame detachably secured to said connection panel, a panel movably mounted on said frame, a series of connector blocks of insulating material carried by said movable panel, a plurality of spaced contact elements carried by each of the last-mentioned connector blocks, each of said contact elements having a contact prong extending from the rear face of the connector block in opposing relation to one of the contact prong-receiving openings of the contact elements of the first-mentioned series of connector blocks, interengaging means on each of the opposing connector blocks of the respective series of connector blocks for aligning the spaced contact elements carried thereby and lever-engaging means on said movable panel for moving the contact elements of the connector blocks carried thereon into and out of engagement with the contact elements of the opposing series of connector blocks.

CHALMERS B. DEWEY.
NORMAN C. ZATSKY.

References Cited in the file of this patent
UNITED STATES PATENTS

| Number | Name | Date |
|---|---|---|
| 1,422,241 | Tomlinson | July 11, 1922 |
| 2,111,118 | Lake | Mar. 15, 1938 |
| 2,432,120 | Neill | Dec. 9, 1947 |
| 2,438,371 | Marholz | Mar. 23, 1948 |
| 2,466,370 | Burtt | Apr. 5, 1949 |
| 2,510,944 | Auerbach | June 13, 1950 |
| 2,535,031 | Beatty | Dec. 26, 1950 |